United States Patent [19]

Le Roy

[11] Patent Number: 5,044,320

[45] Date of Patent: Sep. 3, 1991

[54] WATER DISPENSER, PARTICULARLY FOR POULTRY

[76] Inventor: Ernest Le Roy, 48, rue Monsieur-Vincent, BP 56132, 35056 Rennes Cedex, France

[21] Appl. No.: 391,446

[22] Filed: Aug. 9, 1989

[30] Foreign Application Priority Data

Aug. 17, 1988 [FR] France ................................ 88 11076

[51] Int. Cl.$^5$ ............................................... A01K 7/00
[52] U.S. Cl. .................................................... 119/72.5
[58] Field of Search ............... 119/72.5, 75, 72, 51.01, 119/51.5, 53.5, 54; 251/339, 337, 303

[56] References Cited

U.S. PATENT DOCUMENTS 2,510,252  6/1950  Pine et al. ............................ 119/72.5
3,887,165  6/1975  Thompson ............................ 251/339

FOREIGN PATENT DOCUMENTS 62642    9/1891  Fed. Rep. of Germany .
3744483  9/1988  Fed. Rep. of Germany ..... 119/72.5

Primary Examiner—Gene Mancene
Assistant Examiner—R. Thomas Price
Attorney, Agent, or Firm—Laff, Whitesel, Conte & Saret

[57] ABSTRACT

A water distributor is for use especially by poultry. The valve body (3) having a valve stem (8) which is hung on a return spring (6), at the bottom of a pipe. The valve stem (8) obstructs the pipe (3) as long as it is not made to tilt by the animals. The valve stem (8) is a nipple which is substantially egg shape, the point (11) of which faces downwardly. The spherical cap (9) of the egg shape is held against the seat (5) of the valve. The center of the gap is hooked to the return spring (6). The tilt of the valve stem is limited in an omnidirectional manner. One embodiment comprises a crown (20) under which arms hang(12'), the ends of which the arms join the valve stem (8).

7 Claims, 2 Drawing Sheets

WATER DISPENSER, PARTICULARLY FOR POULTRY

BACKGROUND OF THE INVENTION

The present invention relates to a water distributor, particularly for poultry, comprising a valve in which the valve body is a pipe and of which the valve stem is hung on a return spring, itself suspended at the bottom of the pipe, the valve stem obstructing the pipe as long as it is not made to tilt by the animals.

In practice, this type of water distributor that can be used by poultry, rabbits etc. is intended to provide a flow of water corresponding precisely to the direct needs or intake capacities of the animal.

Water distributors are already known in which flow is caused by the lifting of a valve stem. Such water distributors have the major disadvantage of not being tightly sealed when the valve stems are fitted on a single pipe, which is generally the case, and that the pipe is subjected to vibration, especially when the distributors are coupled to the food distribution installation. However, the fitting of the distributors on the food distribution installation is in practice very effective.

Document U.S.-A-2,510,252 describes a drop-by-drop distribution valve for poultry which comprises a water supply source having a delivery means which is open towards the base and provided with a seating, a valve stem closing the delivery by rising adjacent to the above seating, a spring returning the valve stem onto the seating, means for preventing the valve stem closing beyond a position which enables a film to be formed, and a suspended rod which is exposed to blows from the beaks of birds causing it to vibrate laterally, so that the valve stem allows at least one drop of water to pass, which collects at the base of the rod where the drop may be drunk.

The purpose of the valve described in document U.S.-A-2,510,252 is to prevent too great a quantity of water flowing when the rod is actuated by a bird, which causes a useless waste of water and wetting of the surrounding area which may be prejuduicial to the welfare of the poultry.

One disadvantage of the valve described in document U.S.-A-2,510,292 relates to the shape of the lower part of the valve stem and to the locations of the stops limiting the slope angle of the valve stem. The return spring is hooked into a groove in the lower part of the valve stem. In practice this groove is also intended to trap the water in its descent and act as a buffer reservoir. However, the coils of the spring along the valve stem retard the descent of the water. The stops, which, when the valve stem is steeply inclined, come into contact with the cylindrical portion of the valve stem or its vicinity, similarly trap the water through the effects of capillarity action. The result of all these influences is that there is an appreciable delay between the moment when the bird actuates the valve stem and the moment when the water is presented to the bird at the base of the valve stem. The bird may not have waited so that the water drops off before being drunk as there is not direct relation between the demands for water and the presentation of the water, which incurs the risk of causing the groove to overflow.

BRIEF DESCRIPTION OF INVENTION

An aim of the present invention is to provide a water distributor as indicated in the above introduction, which does not possess the disadvantages already quoted, but does have the advantages associated especially with the direct relation between the birds' demands for water and the availability of the water demanded, with the consequent elimination of the loss of water through excess flow with normal actuation of the valve stem.

In accordance with one characteristic, the valve stem is a nipple substantially of egg shape, the point of which is directed downwards and the spherical cap rests against the seat of the valve, the center of this cap being hooked to the said return spring, means being provided for limiting the tilt angle of the valve stem in an omnidirectional manner.

In accordance with another characteristic, the intermediate portion of the valve stem is of truncated form being joined to the spherical cap and tapering towards the point.

In accordance with another characteristic, the lower point of the valve stem is constituted by the lateral wall of a truncated cone containing a metal ball.

In accordance with another characteristic, the means for limiting the tilt of the valve stem are constituted by a crown under which are hung arms, the extremities of which join, with practically no gap, onto the intermediate truncated portion of the valve stem, with the integral means of the valve seat limiting the vertical downward movement of the arms.

In accordance with another characteristic, these integral means of the seat directly limit the vertical movement of the crown.

In accordance with another characteristic, each arm is of elbow shape with a vertical portion hanging directly under the crown and an oblique portion joining onto the valve stem, the base of the vertical portion being wider towards the outside than the oblique portion and acting as a stop, and the means for limiting the vertical movement are constituted by a second crown located below these stops and integral with the seat of the valve.

In accordance with another characteristic, the seat is equipped with a tight seal.

The characteristics of the invention given above, along with others, will appear more clearly on reading the descriptions of embodiments, the description being given in association with the attached diagrams, including:

DETAILED DESCRIPTION OF INVENTION

Figure 1:
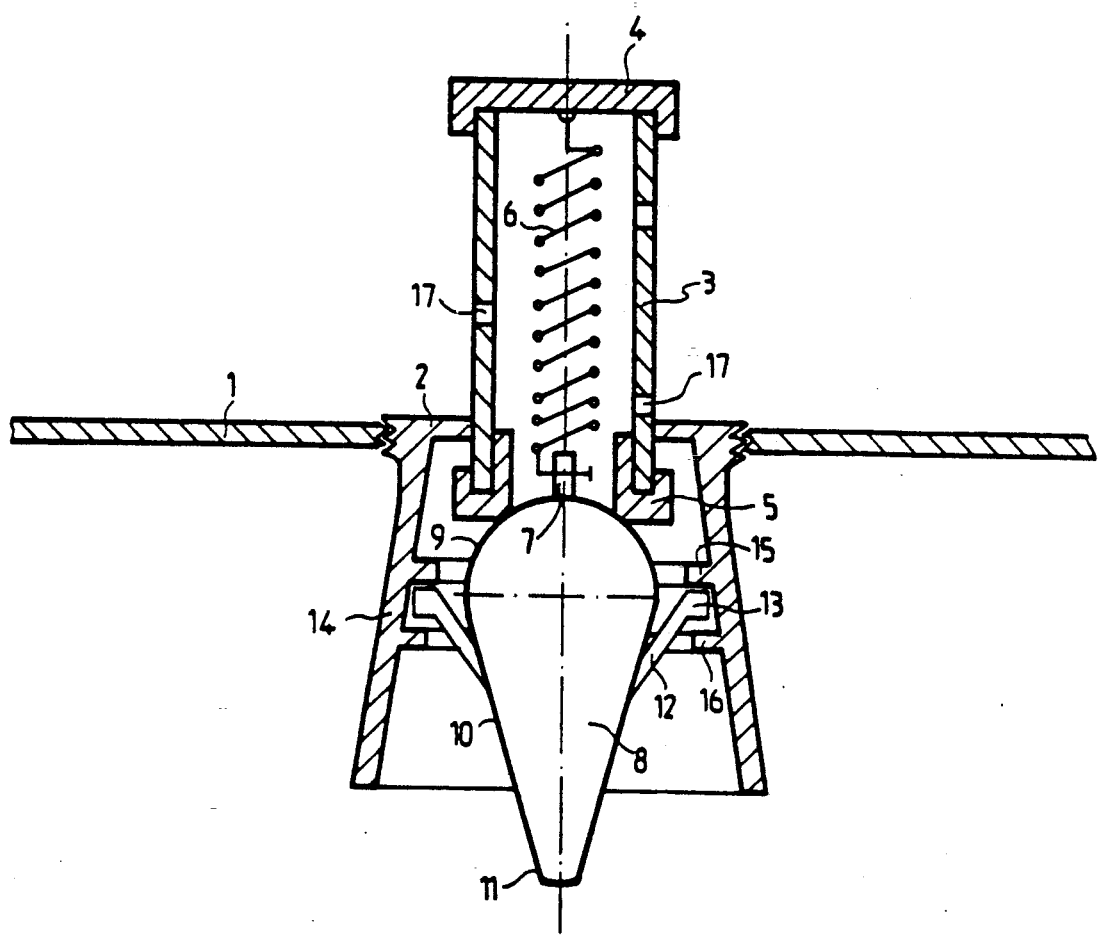
FIG. 1 is a vertical cross-section of a water distributor in accordance with the invention.

The water distributor of FIG. 1 is intended for fitting in the bottom of the down-spout or a drinking bowl 1. It comprises a fixing collar 2 screwed in the base of bowl 1 and in which is fitted vertically a tubular pipe 3 surmounted by a cap 4, and provided with a seat 5 at its lower part. To the center of the cap 4 is attached the upper end of a traction spring 6, the lower end bearing a valve stem 8 through the intermediary of a nipple 7. The spring 6 acts as a return spring to hold the upper surface of the valve stem 8 against the seat 5.

The valve stem 8 is substantially of egg shape the point of which faces downwards, with an upper portion 9 in the form of a portion of a sphere, an intermediate portion 10 in the form of a truncated cone joining without a gap onto the spherical portion 9, and a rounded point 11. The nipple 7 is integral with the valve stem 8 and stands upright on the summit of the spherioal portion 9.

From the intermediate portion 10 of the valve stem, arms 12 rise obliquely upwards, the free ends of which 13 have a horizontal elbow over a short section. Moreover, below the collar 2 there is a truncated cone 14 widening downwards, and within which there are two circular ribs 15 and 16 which between them define an annular gap within which the ends 13 of the arms 12 are held captive with a certain amount of play. The assembly of the arms with their ends 13 and the ribs 15 and 16 acting as stops for the ends 13.

Finally, holes 17 in the pipe 3 allow the water from the downspout 1 to emerge above the spherical portion 9 of the valve stem 8.

The functioning of the distributor of FIG. 1 will now be described. In the rest state, the valve stem 8 is vertical with its spherical portion 9 held by the return spring 6 against the seat 5 so that the valve is tightly sealed. The water does not run off. When a bird pecks the rounded point 11, the valve stem 8 tilts with one end 13 of the arm 12 away from the bird's beak coming into contact with the upper rib 15 and the end 13 of the arm 12 near to the beak coming into contact with the lower rib 16. The result is that the valve stem tilts with a slight release of the spherical portion 9 from the seat 5. An amount of water one drop in volume runs along the valve stem and forms a drop at the base of the rounded point 11. The bird can then drink this drop.

Figure 2:
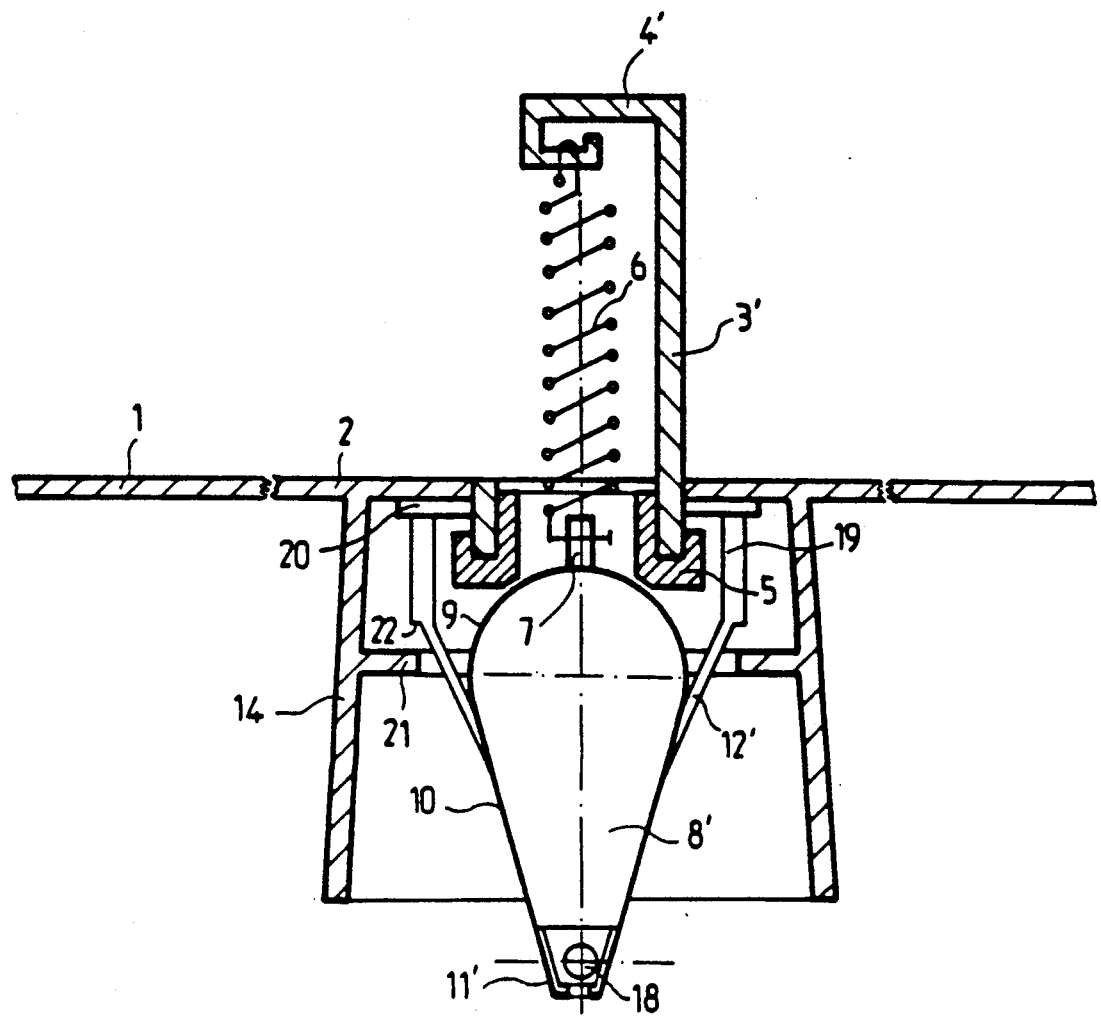
FIG. 2 is a cross-section of a preferred variant of the water distributor of FIG. 1.

The variant of the water distributor shown in FIG. 2 in fact constitutes a preferred embodiment in accordance with the invention. FIG. 2 keeps the same numerical references when they indicate items already mentioned in relation to FIG. 1. This distributor is similarly intended for fitting in the bottom of the down-spout 1 of a drinking bowl. A fixing collar 2 is screwed into the base 1 and carries a tubular pipe portion 3' equipped at its base with a valve seat 5. At its upper end 4' in the form of a hook is attached the upper end of a traction spring 6 the lower end of which supports a valve stem 8' through the intermediary of a nipple 7. The spring 6 acts a return spring to hold the upper surface of the valve stem 8' against the seat 5.

The valve stem 8' has substantially the same form as the valve stem 8, with a spherical portion 9, an intermediate portion 10, but with a point 11'comprising a substantially truncated space with a metal wall in which a small metal ball 18 is held captive, the role of which will be described in the following.

Rising obliquely upwards from the intermediate portion 10 of the valve stem 8' are arms 12', the free ends of which 19 have an elbow in the upward vertical direction and joining onto a ring 20.

Figure 3:
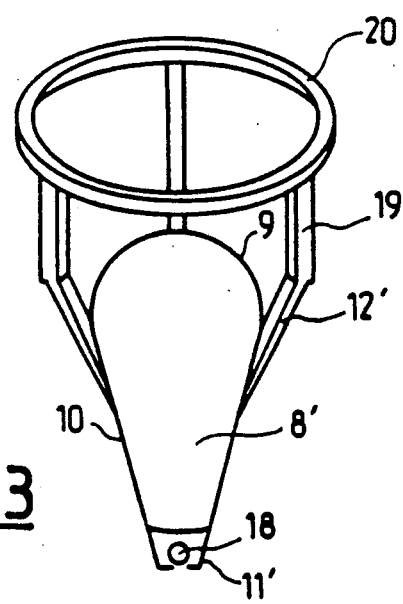
FIG. 3 is a plan diagram of the means for limiting the tilt of the valve stem of the water distributor of FIG. 3.

In practice, as shown in the plan view of FIG. 3, the body of the valve stem 8', the arms 12', their vertical extensions 19 and the ring 20 form just a single piece. FIG. 3 shows a valve stem 8' comprising three arms 12' directed at 0", 120" and 240°, but it must be understood that the number of arms may vary. A single arm or two arms may be used as the places at which water may be retained by capillarity must be limited as much as possible.

Under the collar 2 there is similarly provided a truncated cone 14 widening downwards and within which there is a circular rib 21 located slightly below the bases 22 of the parts 19 of the rib arms 12'. As shown by FIG. 2, the parts 19 are of greater cross-section than the oblique parts of the arms 12', so that the bases 22 may act as stops against the rib 21.

In the rest position, FIG. 2, the ring 20 is held under the collar 2 and encircles the pipe 3' and its seat 5. When a bird pecks the valve stem 8', the latter tilts around the point of the ring 20 the furthest away from the bird's beak and the base 22 nearest this beak is checked on the rib 21. A drop forms under the same conditions as with the water distributor of FIG. 1.

The sleeve 11' and the ball 18 create a metallic sound at each blow imparted by a bird, which tends to attract them and especially help them to find the distributor particularly when they are young.

The valve stem in accordance with the invention may be of plastics material or of metal, depending upon the strength of the poultry to be fed.

I claim:

1. A water distributor, particularly for poultry, said distributor comprising a valve having a valve body in the form of a pipe having a valve seat thereon, a return spring and a valve stem hung on a first end of said return spring and closing said valve seat of the pipe, means for limiting the tilt of the valve stem, said means for limiting the tilt engaging an intermediate portion of the valve stem, the valve stem closing said valve seat as long as the animals do not cause it to tilt, characterized by the valve stem being substantially an egg shaped, a lower portion of said egg shaped stem facing downwardly inward and an upper spherical cap of said egg shaped stem being held against the seat, a center of said spherical cap being hooked to the first end of said return spring biasing said valve stem to a closed position.

2. The distributor in accordance with claim 1, further characterized by an intermediate portion (10) of the body of the valve stem (8) being of a truncated form, being joined to the spherical cap (9), and tapering towards the point (11).

3. The distributor in accordance with claim 1 or 2, characterized by the lower point (11') of the valve stem (8) being constituted by the lateral wall of a truncated cone containing a metal ball (18).

4. The distributor in accordance with one of the claims 1 or 2, characterized by the means for limiting the tilt of the valve stem (8) being constituted by a crown (20) under which arms hang (12'), ends of said arm being join, practically without a gap, onto the intermediated truncated portion (10) of the valve stem (8), and means (21, 22) integral with the seat of the valve limiting the vertical downward movement of the arms.

5. The distributor in accordance with claim 4, characterized by said means integral with the seat directly limiting the vertical movements of the crown (20).

6. The distributor in accordance with one of the claim 1 or 2, characterized by each arm (12') being of an elbow form with a vertical position (19) hanging directly below the crown (20) and an oblique portion joining onto the valve stem (8), the base of the vertical portion (19) being wider towards the outside than the oblique portion and acting as a stop, and the means for limiting the vertical movement being constituted by a second crown (21) located under the said stops and integral with the seat of the valve.

7. The distributor in accordance with one of the claim 1 or 2, characterized by the seat (5) being equipped with a tight seal.

* * * * *